Feb. 23, 1954    J. M. PUGH    2,669,829
CANE HARVESTING AND PILING MACHINE
Filed Feb. 27, 1953    5 Sheets-Sheet 1
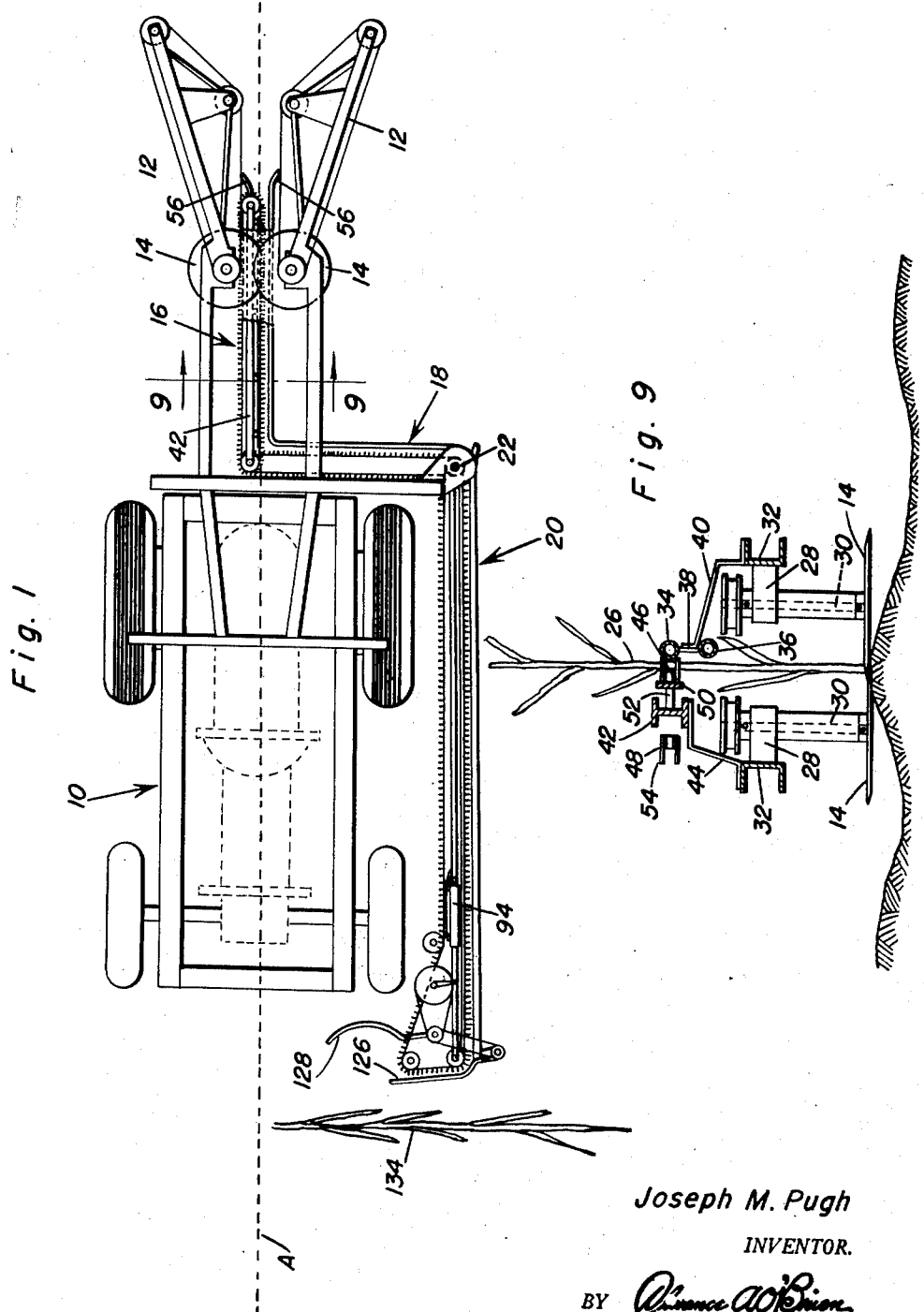
Joseph M. Pugh
INVENTOR.
BY

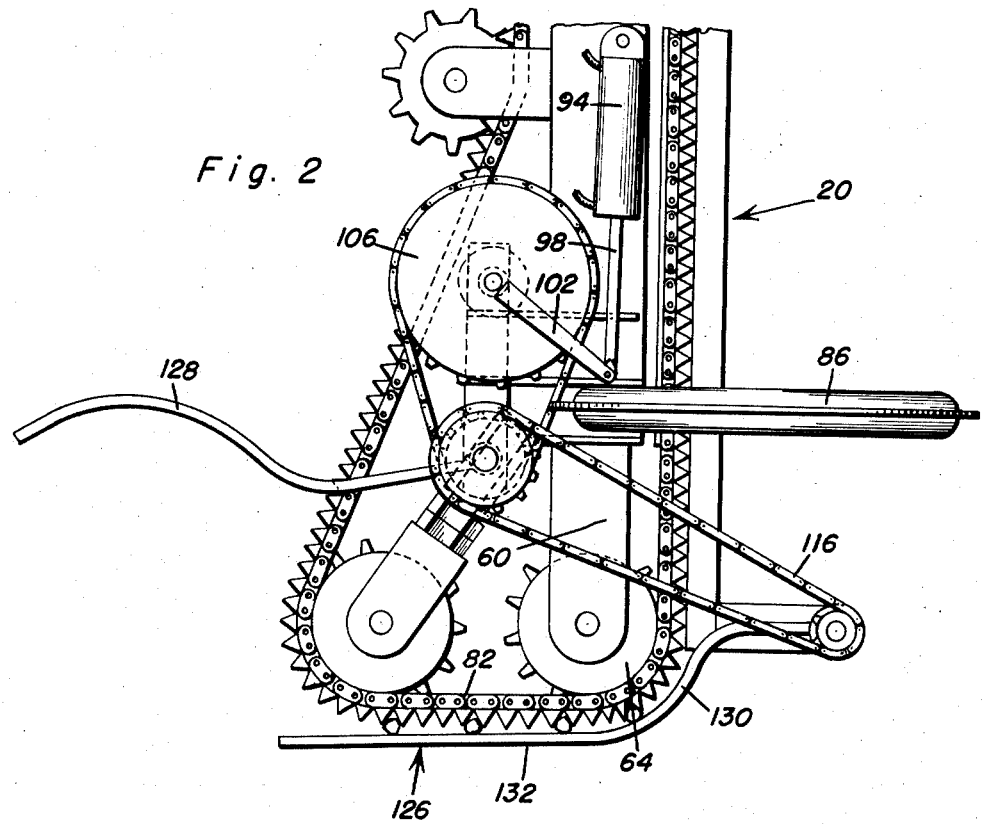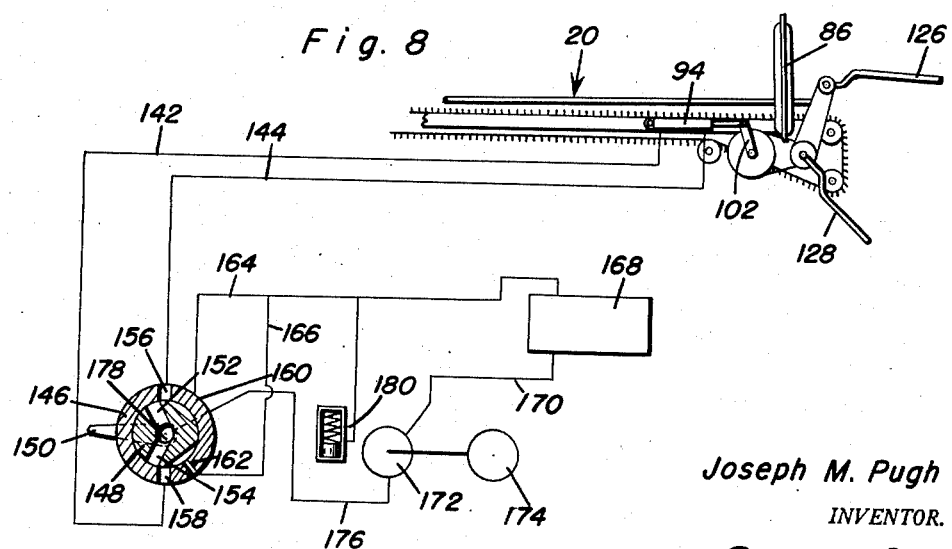

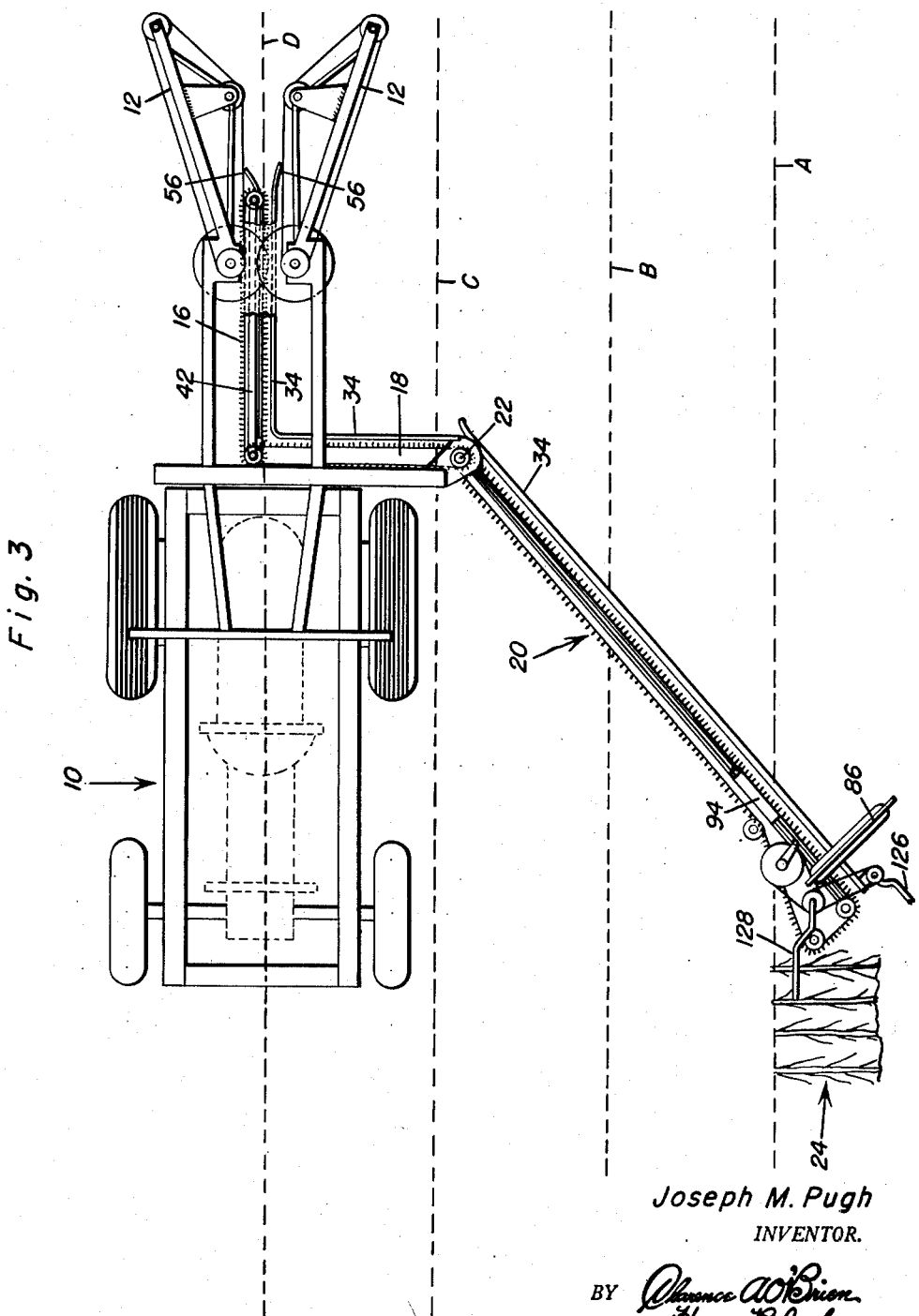

Feb. 23, 1954

J. M. PUGH 2,669,829

CANE HARVESTING AND PILING MACHINE

Filed Feb. 27, 1953

Joseph M. Pugh
INVENTOR.

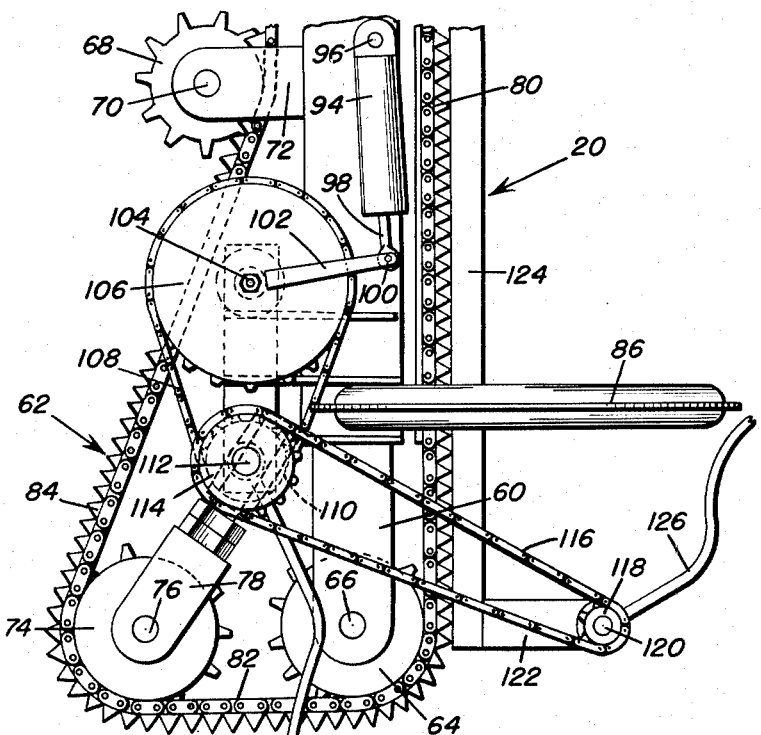
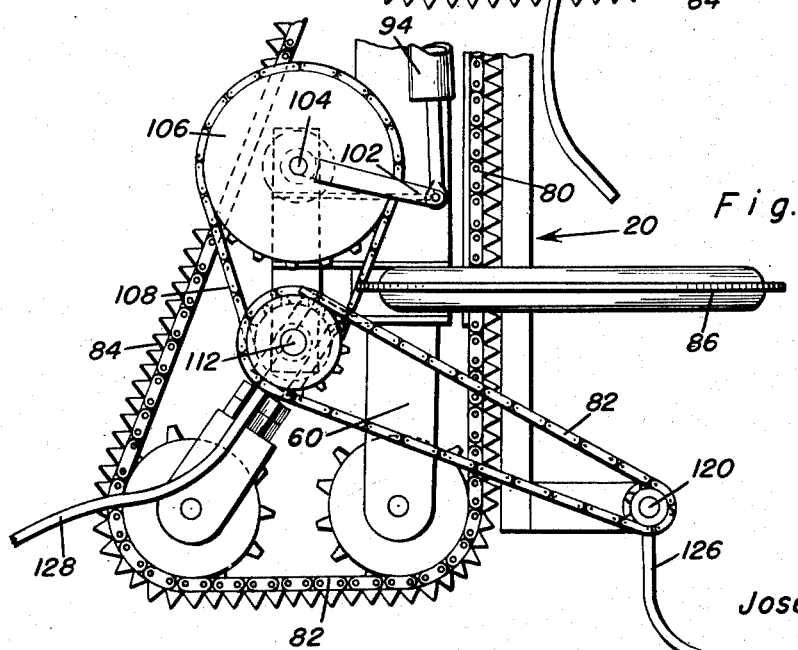

Patented Feb. 23, 1954

2,669,829

UNITED STATES PATENT OFFICE 2,669,829

CANE HARVESTING AND PILING MACHINE

Joseph M. Pugh, Jeanerette, La., assignor, by direct and mesne assignments, of twenty-five per cent to Lawrence C. Lampo, Jr., Iberia Parish, and twenty-five per cent to J & L Engineering Company, Inc., Jeanerette, La., a corporation of Louisiana Application February 27, 1953, Serial No. 339,199

12 Claims. (Cl. 56—192)

This invention comprises novel and useful improvements in a discharge attachment for cane pilers, and more specifically relates to an improved windrowing attachment especially adapted for use with cane pilers of the type disclosed in the prior patent to Thomson, No. 2,427,313, of September 9, 1947; and comprises a cane piler attachment whereby cane cut by the harvesting apparatus from a plurality of successive rows may be piled in a single row whereby the same may be readily gathered.

In cane pilers of the type disclosed in the above identified patent to Thomson, it is known to provide a single cane harvester and piler for simultaneously cutting cane in a row and windrowing or piling this cane in a row; and thereafter depositing the cane cut in successive rows on the same pile, in a manner whereby the cane may be readily handled by conventional loaders. In such apparatuses, however, the first row of cane cut and piled by the apparatus has heretofore been deposited in a row which is spaced laterally and to one side of the direction of travel of the apparatus, whereby the pile of cane is deposited in a pile which extends to one side of the original row of cane which was cut by the apparatus. Such an apparatus therefore requires clearance upon its side, since the row of cane piled is necessarily disposed laterally beyond the sides of the apparatus.

It is a primary object of this invention to provide a cane piling attachment for conventional harvesting machines wherein the first row of cane cut and piled by the apparatus may be deposited in a pile which is abutted substantially upon the original row of cane being harvested and whereby the piled cane extends very little, if any, distance beyond the side of the apparatus, thereby permitting the apparatus to be used much closer to a fence or the like; and wherein a plurality of rows of cane may be harvested and piled upon a single pile by means of a horizontally swinging discharge boom which thus is required to move a relatively shorter distance from the apparatus.

A further important object of the invention is to provide an attachment adapted to be disposed upon the discharge end of a conventional piling conveyor of a harvester whereby the cane discharged by the conveyor may be selectively disposed either behind or to one side of the apparatus.

A more specific object of this invention is to provide a piling attachment which may be readily applied to a conventional cane discharge conveyor boom and which, by means of a pair of reversible guides, can selectively discharge the cane to either side of the conveyor boom as desired.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of a cane harvester and piler to which the discharge attachment in accordance with this invention has been applied, the adjustable baffle or deflector member being positioned for discharging the cane from the first row traveled by the apparatus to the rear of and behind the apparatus;

Figure 2 is a top plan view taken upon an enlarged scale of a portion of the conveyor boom and the piler attachment of this invention applied thereto, the parts being in the position shown in Figure 1;

Figure 3 is a view similar to Figure 1 but showing the position of the apparatus and the attachment as the apparatus is harvesting a fourth row of cane and discharging the harvested cane upon the "heap pile" positioned upon the first row of discharged cane;

Figure 5 is a view similar to Figure 2 but showing the adjustable deflector blades in a different position of adjustment;

Figure 6 is a view similar to Figure 2 but showing the deflector blades in a still further position of adjustment;

Figure 4:
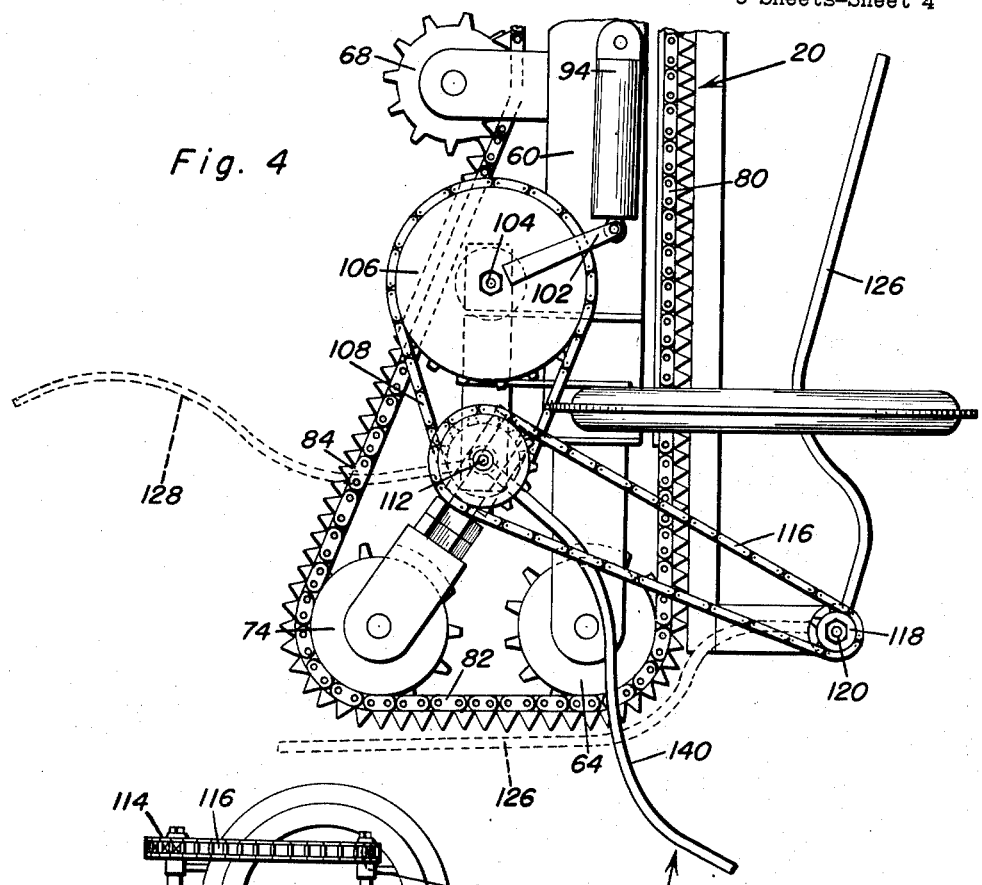
Figure 4 is a view similar to Figure 2 but showing the adjustable deflector or guide blades in one position of operation in full lines and in an alternative position in dotted lines therein.

Figure 8 is a diagrammatic view indicating one form of hydraulic system for controlling the operation of the adjustable deflector blades; and Figure 9 is an enlarged vertical transverse sectional view taken substantially upon the plane indicated by the section line 9—9 of Figure 1 and showing the relative position of the cane stalk cutters or harvester blades and the cane discharge conveyors of the apparatus.

Referring to the accompanying drawings in detail, wherein like numerals refer to like parts throughout, reference is made first to Figures 1 and 3 which show a conventional cane harvester and piler of the same general type and construction disclosed in the above mentioned patent to Thomson and to which the piler attachment of this invention has been applied.

The numeral 10 designates any suitable wheeled frame provided at its forward end with a pair of laterally diverging guide arms 12 which are adapted to embrace a row of standing cane stalks for positioning the same properly for cutting by a pair of cutter blades 14 closely adjacent the earth. The apparatus further includes a longitudinal cane stalk conveyor 16 disposed upwardly above the guide arms 12 for grasping the cane stalk and supporting the same after the stalk has been severed by the cutter blades; and for transporting the stalk rearwardly to a transverse conveyor 18 which moves the severed stalks to the side of the harvester, delivering the stalks then to a horizontally swinging and laterally adjustable conveyor 20 which at its rearward extremity discharges the stalks rearwardly and to one side of the apparatus. In the conventional cane harvester and piler illustrated, the discharge conveyor 20 is mounted for horizontal swinging movement about a pivot or axle 22 whereby the conveyor 20 may be disposed at various angles with respect to the wheeled frame 10, as will be seen by a comparison of Figure 1 and Figure 3. This lateral swinging movement is intended to position the discharge end of the discharge conveyor 20 to cause the cane cut from successive rows, which are indicated in the drawings in dotted lines at A, B, C and D, to a pile sometimes known as a "heap pile" 24. As will be readily appreciated, as the cane harvester and piler moves upward to the rows B, C and D, the horizontal discharge conveyor 20 will be swung further outwardly from the side of the apparatus in order to discharge the cane from the more remote rows to the heap row upon the pile 24.

As will be readily apparent from Figure 9, the row of standing cane 26 will be cut adjacent its root and just above the surface of the ground by the pair of cutting disks 14. As illustrated, these disks are journaled in suitable bearings 28 by means of vertical axles 30, the bearings 28 being supported upon suitable parallel longitudinally extending frame members 32. The disks 14 may be power driven, although preferably they are disposed in overlapping engagement as shown in Figures 1, 3 and 9, whereby the forward travel of the device will cause the stalks of cane to pass between the overlapping portions of the disks and thus be severed by the forward motion of the apparatus.

Each of the conveyor structures of the members 16, 18 and 20 is of substantially identical design, the same including a pair of upper and lower guide rails 34 and 36, connected together by suitable vertical bracing 38 and being mounted as by brackets 40 upon the frame member 32. The guide rails 34 and 36 are disposed closely adjacent the stalks 26 in their vertical position, as shown in Figure 9, and the stalks slide along the inner surfaces of these guide rails, as set forth hereinafter, during the operation of the conveyors.

Each of these conveyors includes a longitudinally extending frame member 42 which is suitably mounted as by brackets 44 upon one of the channel members 32 and is substantially parallel to and in the same horizontal plane as the upper guide rail 34. Endless conveyor chains having inside and outside flights 46 and 48, respectively, encircle the members 42 upon suitable supporting, driving and guide rollers, not shown, with the inside flight resting against a backing plate 50 which is parallel to and properly spaced from the upper guide rail 34. The plate 50, in turn, may be supported from the conveyor member 42 as by brackets or webs 52.

The conveyor chain flights 46 and 48 are provided with sets of laterally extending teeth 54, and those of the inner flight are adapted to substantially rub against the guide rail member 34.

Figure 7:
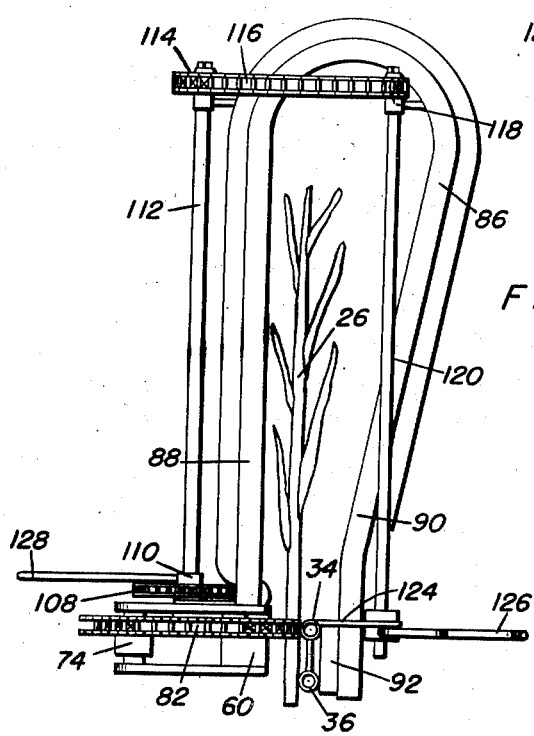
Figure 7 is an enlarged rear end elevational view of the discharge conveyor boom of the apparatus showing the attachment of the present invention applied thereto.

As will be more readily apparent from Figure 7, in conjunction with Figure 9, the spikes or teeth 54 will rub against the rail 34 to provide pockets in which the stalks 26 are held and are slid longitudinally along the guide rails from the front of the apparatus to the discharge end of the same, being transported while in the vertical position by means of the conveyor sections 16, 18 and 20.

The section 16 at its forward end, and in advance of the cutter blades 14 is provided with divergent entrance portions 56 by which the standing stalks are inserted in the pockets of the conveyor chain between the teeth thereof and the guide rail 34 and are moved along this guide rail by being held in the pockets of the chains during forward progress of the apparatus until the stalks are cut by the cutter blades, after which the stalks are supported and held during their travel throughout the length of the conveyor system.

Suitable means, not shown, are provided whereby the angle of the discharge section 20 of the conveyor system may be adjusted laterally from a position parallel to the wheeled frame, as shown in Figure 1, to its outermost adjusted position, shown in Figure 3, or to intermediate positions. The mechanism for such adjustment being of a conventional and known design forms in itself no part of the present invention, and it is to such an apparatus as above described that the novel attachment of the present invention has been applied.

Referring now more specifically to the detail views of Figures 2, 4–7, it will be seen that the discharge conveyor section 20 includes a horizontally swinging boom 60 which supports the conveyor chain and the associated mechanism, and which is pivoted to the vertical axle 22 previously mentioned for horizontal swinging movement about this axis in laterally adjusted positions. A conveyor chain, indicated in its entirety by the numeral 62, is journaled upon suitable driving and guiding sprockets upon the boom 60, these including a sprocket 64 providing a lateral bend pivoted to the boom member 60, as at 66, together with an idler or slack take-up sprocket 68 journaled as at 70 upon a lateral extending bracket 72 upon the boom 60, and a further guide sprocket 74 carried by an axle 76 upon an adjustable support member 78 likewise operatively carried by the boom 60. By means of this sprocket system, the chain 62 has a longitudinally extending flight 80 which extends to the sprocket 64; a transversely disposed reach 82 extending between the sprockets 64 and 74, and a return reach 84 entrained over the sprocket 74, 68 and extending back to a sprocket, not shown, revolving about the axis of the member 22.

As shown best in Figure 7, the rear or discharge end of the conveyor section 20 is provided with a U-shaped, ribbed bracket member 86 which has one vertical leg 88 secured to the boom 60 and has its other leg 90 supporting, as by laterally extending brackets 92, the previously mentioned guide rails 34 and 36.

A hydraulically operated cylinder and piston unit 94 of a known and conventional design is pivotally connected as at 96 to the boom member 60 and has its piston rod 98 pivoted at 100 to a lever 102 which is fixedly secured to a vertical shaft 104. The shaft 104 has a driving sprocket 106 thereon over which is entrained a sprocket chain 108 which is drivingly connected to a sprocket gear 110 fixedly secured to a vertical shaft 112 at the lower end thereof. At the upper end of the shaft 112, there is secured a further sprocket 114 having a sprocket chain 116 secured thereto and which is drivingly connected to a sprocket gear 118 secured to the vertical shaft 120. The shaft 120 is journaled upon a laterally extending bracket 122 which is mounted upon the side of a longitudinal beam 124 which is likewise secured to the guide rail members 34, 36 and their supporting brackets 92.

A pair of deflector blades 126 and 128 are fixedly secured to and extend radially from the shafts 120 and 112, respectively, or if desired, the blade 128 may be secured to the hub of the sprocket gear 110.

By means of these sprocket chains and sprocket gears, it will be observed that the deflector blades 126 and 128 are connected for timed and synchronized movement with respect to each other. Any suitable gear ratios may be provided in order to obtain the desired relative motion of the deflector blades, as set forth hereinafter.

Referring now particularly to the deflector blade 126, it will be observed from Figure 2 that the same is so shaped that when the blade is disposed inwardly with respect to the conveyor section 20, that the blade has a curved portion 130, terminating in a relatively straight portion 132. The curved portion is adapted to form a continuation from the discharge end of the guide rails 34 and 36, and extends in closely adjacent relation to the sprocket gear 64, while the straight portion 132 is disposed in close parallel relation to the transverse flight 82 of the conveyor chain. When the deflector blade 126 is positioned as shown in Figure 2, cane stalks carried rearwardly of the conveyor section 20 by the flight 80 of the conveyor chain instead of being discharged from the end of the chain will be moved around the section 130, and it will be moved transversely inwardly of and behind the cane piling apparatus along the section 132, being discharged from the extremity of the same. In this position of the device, the cane will be discharged and piled in a row as indicated by the numeral 134 in Figure 1. It will be seen that this pile of cane will be placed with its ends against the row D which is being cut by the blades 14. With this arrangement of the deflector blades, the cane is thus cut from the row A and moved rearwardly along the section 16, transversely upon the section 18, and then down the discharge section 20 parallel to the side of the cane harvesting and piling device, and then is moved transversely inwardly along the deflector blade 126 and discharged at the position 134. The cane thus piled extends from the row being cut to the side edge of the apparatus or slightly beyond the same, as illustrated in Figure 1.

During this position of the deflector blade 126, the sprocket chain connection causes the deflector blade 128 to be disposed in the inoperative position shown in Figure 2.

After the first row A has been cut and piled, in the rear of the cane harvesting and piling apparatus, as illustrated in Figure 1, the device is then started upon the row B. In this position, the deflector blades are shifted so that the cane harvested and cut from the row B is not thrown behind the harvesting and piling device, but instead, is thrown over also on the row A to be deposited upon the "heap pile" 24 thereon. For this purpose, the hydraulic actuating cylinder 94 is manipulated to move the lever 102 from the position shown in Figure 2 to the position shown in Figures 4 or 5. The deflector blade 128 terminates in a curved portion 140, which, when the blade is positioned as shown in Figure 4, is disposed adjacent and rearwardly of the termination of the guide rails 34 and 36 whereby the cane carried by the chain flight 80 will engage the portion 140 of the blade 128 and be deflected towards the right. In this position, it is unnecessary to change the angular adjustment of the discharge section 20 of the conveyor from that shown in Figure 1, it being merely necessary to readjust the deflector blades.

It will be observed that the deflector blades are so connected that while the blade 126 moves through substantially 270° from the dotted line position of Figure 4 to the full line position therein, the blade 128 moves through substantially 125° from the dotted line position of Figure 4 to the full line position therein. Appropriate gear ratios between the various sprocket gears provide the necessary shifting of the blades to alternately position the same for discharging the cane either behind or to the side of the harvesting and piling device.

After the row B has been cut and piled, the device is moved over to the row C, and traveling down this row again cuts and piles the cane. In this position, however, the section 20 has been angularly adjusted to cause the end of the same to overlie the row A or be appropriately positioned relative thereto for discharging and piling the cane onto the heap pile 24 in the row A.

Finally, the harvesting and piling device moves along the row D, this being the fourth row, and the position shown in Figure 3 is obtained, with the discharge section 20 being disposed to its outermost position, as illustrated, for piling the cane cut in the row D upon the heap pile 24 of the row A.

It is obvious that appropriate proportioning of and dimensioning of the parts will enable four or more rows to be cut and piled in a single row, as desired.

It will also be observed that since the first row cut is piled rearwardly of the device, the latter is enabled to move much closer to a fence and will cut and pile cane directly behind the device, enabling the same to be used or started with any row in a cane field. Since the first row is piled behind the device, the latter can harvest and pile four rows with the end of the section 20 being closer to the device than in conventional mechanisms.

It will of course be apparent that whichever blade is disposed in operative position will be so positioned as to discharge the cane from the conveyor at the most appropriate position and angle to obtain a neat and orderly heap pile 24.

Any suitable means may be employed for controlling the alternate adjustment of the deflector blades 126 and 128. By way of example, and not as a limitation of the principles of this invention, Figure 8 discloses diagrammatically a suitable system. A pair of hydraulic conduits 142 and 144 are connected to opposite ends of the cylinder 94 for supplying hydraulic fluid to actuate the piston of the cylinder in either direction and thereby oscillate the deflector blade shifting lever 102. These two conduits communicate with a control valve casing 146 having a cylindrical distributing control valve 148 therein provided with a manual operating handle 150. The valve has a pair of angularly disposed radial passages 152 and 154 therein adapted to selectively register with the valve ports 156 and 158 with which the conduits 142 and 144 are respectively connected, and with fluid pressure discharge ports 160 and 162 which are respectively connected to fluid exhaust or return conduits 164 and 166 which in turn discharge into a fluid reservoir 168.

Fluid is drawn from this reservoir by a conduit 170 through a pump 172 of any desired construction operated from a motor 174 and is delivered by a conduit 176 to the fluid pressure inlet port 178 in the valve 148 and into the passages 152 and 154. A suitable pressure safety valve 180 relieves the pressure of the conduit 176 and discharges the same into the return conduit 164.

By this arrangement, it is possible to apply the fluid pressure to one of the conduits 142 or 144, while exhausting the fluid from the other end of the cylinder 94 from the other conduit. By this means, the deflector blades may be adjusted in alternation to thus control the direction of the discharge of the cane stalks from the piler.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a cane harvesting and piling machine, a longitudinal discharge conveyor operatively connected to said machine along one side thereof, said conveyor having a front end and a rear discharge end, said conveyor at its rear discharge end extending around a vertical axis to provide a lateral bend, and a deflector blade extending across the discharge end of said conveyor to deposit cane to one side of the medial longitudinal axis of the conveyor and rearwardly of the machine.

2. In a cane harvesting and piling machine, a longitudinal discharge conveyor operatively connected to said machine along one side thereof, said conveyor having a front end and a rear discharge end, said conveyor at its rear discharge end extending around a vertical axis to provide a lateral bend, and a deflector blade extending across the discharge end of said conveyor to deposit cane to one side of the medial longitudinal axis of the conveyor and rearwardly of the machine, said discharge conveyor being pivotally connected to said machine for horizontal swinging movement.

3. In a cane harvesting and piling machine, a longitudinal discharge conveyor operatively connected to said machine along one side thereof, said conveyor having a front end and a rear discharge end, said conveyor at its rear discharge end extending around a vertical axis to provide a lateral bend, and a deflector blade extending across the discharge end of said conveyor to deposit cane to one side of the medial longitudinal axis of the conveyor and rearwardly of the machine, said discharge conveyor being pivotally connected to said machine for horizontal swinging movement, about a vertical pivot operatively connected to the front end of the conveyor.

4. In a cane harvesting and piling machine, a longitudinal discharge conveyor operatively connected to said machine along one side thereof, said conveyor having a front end and a rear discharge end, said conveyor at its rear discharge extending around a vertical axis to provide a lateral bend, and a deflector blade extending across the discharge end of said conveyor to deposit cane to one side of the medial longitudinal axis of the conveyor and rearwardly of the machine, said discharge conveyor being pivotally connected to said machine for horizontal swinging movement, about a vertical pivot operatively connected to the front end of the conveyor, and to the front end of the machine.

5. In a cane harvesting and piling machine, a longitudinal discharge conveyor operatively connected to said machine along one side thereof, said conveyor having a front end and a rear discharge end, said conveyor at its rear discharge end extending around a vertical axis to provide a lateral bend, and a pivoted deflector blade extending across the discharge end of said conveyor cane to one side of the medial longitudinal axis of the conveyor and rearwardly of the machine.

6. The combination of claim 1 including cutter means disposed in front of said machine and between the sides thereof and mounted thereon, means for transporting and delivering stalks of cane severed by said cutter means to said conveyor at the front end thereof.

7. The combination of claim 1 including cutter means disposed in front of said machine and between the sides thereof and mounted thereon, means for transporting and delivering stalks of cane severed by said cutter means to said conveyor at the front end thereof, said discharge conveyor being pivotally connected to said machine for horizontal swinging movement.

8. The combination of claim 5 including cutter means disposed in front of said machine and between the sides thereof and mounted thereon, means for transporting and delivering stalks of cane severed by said cutter means to said conveyor at the front end thereof.

9. The combination of claim 1 wherein said deflector blade has its pivot operatively mounted upon said conveyor adjacent said rear discharge end whereby said blade is movable from an inoperative position at one side of the conveyor to its operative position extending across the discharge end of the conveyor for depositing cane directly behind the machine and transversely upon the row being traversed by the machine.

10. The combination of claim 1 wherein said deflector blade has its pivot operatively mounted upon said conveyor adjacent said rear discharge end whereby said blade is movable from an inoperative position at one side of the conveyor to its operative position extending across the discharge end of the conveyor for depositing cane laterally to one side of the machine and transversely upon the row next to that being traversed by the machine.

11. The combination of claim 1 wherein said deflector blade has its pivot operatively mounted upon said conveyor adjacent said rear discharge end whereby said blade is movable from an inoperative position at one side of the conveyor to its operative position extending across the discharge end of the conveyor for depositing cane directly behind the machine and transversely upon the row being traversed by the machine, an actuating mechanism for imparting swinging movement to said deflector blade including an axle mounted upon said conveyor and carrying said deflector blade, an actuator on said conveyor, a connection between said actuator and said axle.

12. The combination of claim 11 including an additional deflector blade having a pivotal mounting upon said conveyor whereby it is horizontally swingable from an idle position at one side of said conveyor into an operative position extending across the discharge end of the conveyor for depositing cane laterally to one side of the machine and transversely upon the row next to that traversed by the machine, and a connection operatively connecting the additional deflector blade to said actuator.

JOSEPH M. PUGH.

References Cited in the file of this patent

UNITED STATES PATENTS

| Number | Name | Date |
|---|---|---|
| 488,251 | Reese | Dec. 20, 1892 |
| 829,328 | Durieu, Jr. | Aug. 21, 1906 |
| 1,308,643 | Rinehardt | July 1, 1919 |
| 2,136,560 | Nichols | Nov. 15, 1938 |
| 2,281,904 | Wurtele | May 5, 1942 |
| 2,427,313 | Thomson | Sept. 9, 1947 |
| 2,582,051 | McCloskey, Jr. | Jan. 8, 1952 |
| 2,626,698 | Appel | Jan. 27, 1953 |

FOREIGN PATENTS

| Number | Country | Date |
|---|---|---|
| 996,242 | France | Aug. 29, 1951 |